United States Patent
Nakano

(10) Patent No.: US 7,603,900 B2
(45) Date of Patent: Oct. 20, 2009

(54) LEAKAGE INSPECTION APPARATUS FOR LIQUID STORAGE TANK TECHNICAL FIELD

(75) Inventor: Yukinaga Nakano, Toyama (JP)

(73) Assignee: Toyama Inspection Co., Ltd., Toyama-Shi (JP)

( * ) Notice: Subject to any disclaimer, the term of this patent is extended or adjusted under 35 U.S.C. 154(b) by 197 days.

(21) Appl. No.: 11/571,414
(22) PCT Filed: Jun. 13, 2005
(86) PCT No.: PCT/JP2005/010787
§ 371 (c)(1), (2), (4) Date: Dec. 28, 2006
(87) PCT Pub. No.: WO2006/003783
PCT Pub. Date: Jan. 12, 2006

(65) Prior Publication Data
US 2007/0220969 A1    Sep. 27, 2007

(30) Foreign Application Priority Data
Jul. 1, 2004    (JP)  ............... 2004-195745

(51) Int. Cl.
G01F 23/30    (2006.01)
(52) U.S. Cl. ...................................................... 73/314
(58) Field of Classification Search .................. 73/314, 73/319; 220/565–567.2; 324/207.13, 207.21
See application file for complete search history.

(56) References Cited

U.S. PATENT DOCUMENTS 3,458,656 A * 7/1969 Sewerin ....................... 73/592

(Continued)

FOREIGN PATENT DOCUMENTS

JP    61-023917 A    1/1986

(Continued)

OTHER PUBLICATIONS (English language) International Preliminary Report on Patentability, Chapter I of the Patent Cooperation Treaty and Written Opinion of the International Searching Authority, dated Jan. 25, 2007, for PCT/JP2005/010787, 5 sheets.

(Continued)

*Primary Examiner*—John Fitzgerald
(74) *Attorney, Agent, or Firm*—Frishauf, Holtz, Goodman & Chick, P.C.

(57) ABSTRACT

At least a part of a periphery of a liquid storage tank is submerged in water. A leakage inspection apparatus has a depressurizing device that depressurizes the inside of the liquid storage tank. The apparatus includes a rod part inserted in the liquid storage tank. A float is fitted with the rod part such that it floats on the surface of the liquid in the storage tank and moves along the rod part in accordance with displacement of the liquid surface. A moving magnet is provided in the float, and a reference magnet is fixed at a lower portion of the rod part. A body part detects the position of each of the moving magnet and the reference magnet, and a measuring device determines the position of the moving magnet relative to the reference magnet in accordance with a signal from the body part.

2 Claims, 4 Drawing Sheets

U.S. PATENT DOCUMENTS

| | | | | |
|---|---|---|---|---|
| 4,858,470 | A | * | 8/1989 | Kincaid et al. ................. 73/654 |
| 4,929,368 | A | * | 5/1990 | Baumoel .................... 508/181 |
| 5,076,100 | A | * | 12/1991 | Hunter et al. ............. 73/290 V |
| 5,189,911 | A | * | 3/1993 | Ray et al. ..................... 73/292 |
| 5,211,202 | A | * | 5/1993 | Zink et al. .................. 137/350 |
| 5,319,956 | A | | 6/1994 | Bogle et al. ............... 73/40.5 A |
| 5,421,193 | A | * | 6/1995 | Carlin et al. ................. 73/49.2 |
| 6,058,775 | A | * | 5/2000 | Levy ........................... 73/292 |
| 6,289,728 | B1 | * | 9/2001 | Wilkins ....................... 73/149 |
| 2005/0056090 | A1 | * | 3/2005 | McSheffrey et al. .......... 73/291 |
| 2008/0099490 | A1 | * | 5/2008 | Burwell ................... 220/567.1 |

FOREIGN PATENT DOCUMENTS

| | | |
|---|---|---|
| JP | 04-086537 A | 3/1992 |
| JP | 08-327491 A | 12/1996 |
| JP | 10-019717 A | 1/1998 |
| JP | 10-48026 A | 2/1998 |
| JP | 2002-040041 A | 2/2002 |
| JP | 2003-148954 A | 5/2003 |
| JP | 3100913 U | 1/2004 |

OTHER PUBLICATIONS (Japanese language) International Preliminary Report on Patentability, Chapter I of the Patent Cooperation Treaty and Written Opinion of the International Searching Authority, dated Jan. 18, 2007, for PCT/JP2005/010787, 6 sheets.

* cited by examiner

F I G. 4
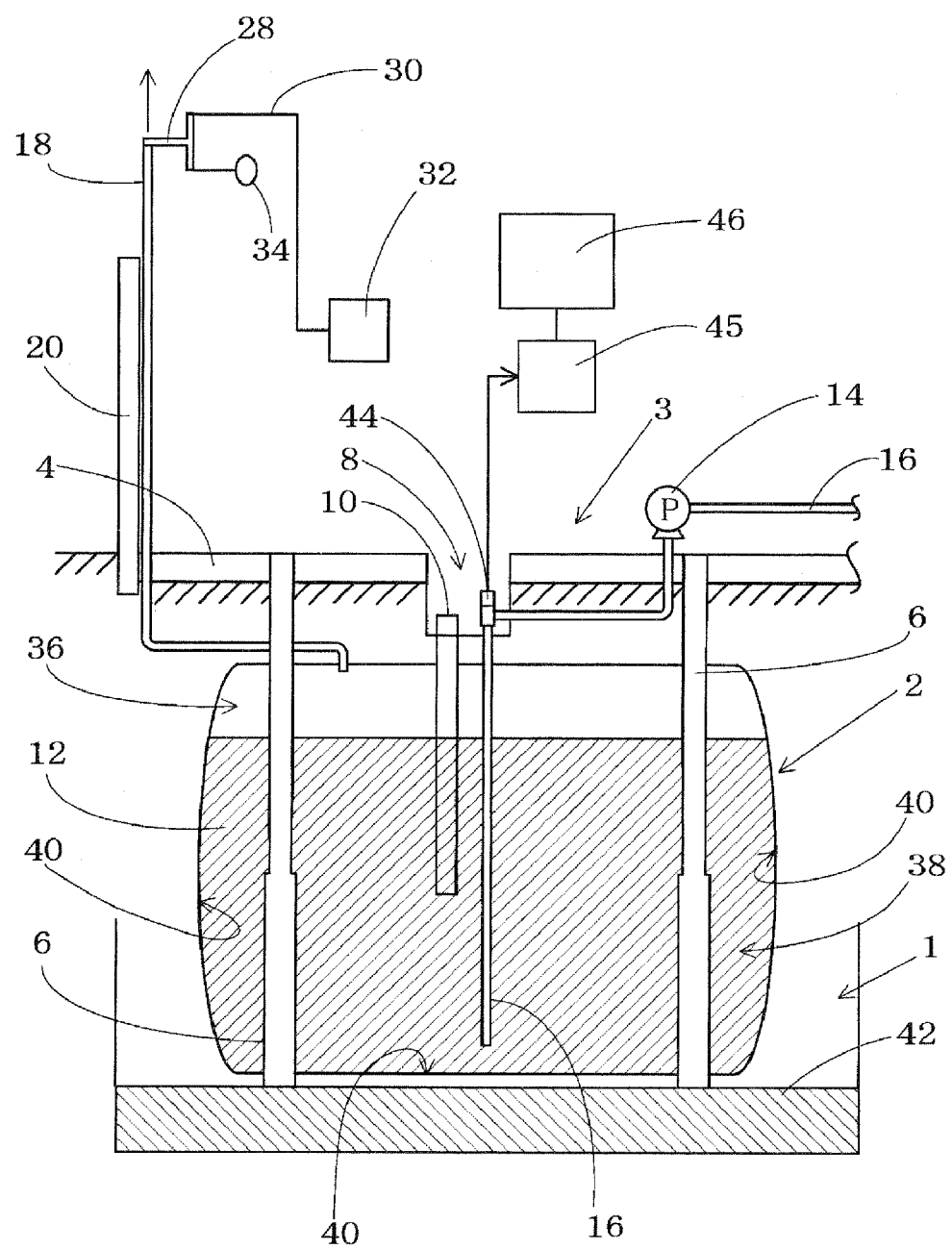

LEAKAGE INSPECTION APPARATUS FOR LIQUID STORAGE TANK TECHNICAL FIELD

TECHNICAL FIELD

This invention relates to a leakage inspection apparatus for inspecting leakage from a liquid storage tank of gasoline or the like.

BACKGROUND ART

For example, at a gas station or the like, gasoline, light oil or kerosene is stored in a liquid storage tank that is installed underground. Under the Fire Service Law, inspection for presence or absence of leakage from this liquid storage tank is obligatory immediately after the installation and periodically. Inspection methods typically include a pressurizing test method, a micro-pressurizing test method, and a micro-depressurizing test method.

The pressurizing method includes a gas pressurizing method and a liquid pressurizing method. In both cases, gas or liquid is encapsulated in a tank as an inspection target, and after the inside of the tank is pressurized to reach a prescribed pressure and left in a still state, determination is made on the basis of whether the pressure drop value maintains a value within a reference range. Nitrogen gas ($N_2$) is used in the gas pressurizing method, and water is mainly used in the liquid pressurizing method.

In the micro-pressurizing method, nitrogen gas is encapsulated in the tank, and after the inside of the tank is pressurized to reach a prescribed pressure and left in a still state, determination is made on the basis of whether the pressure drop value maintains a value within a reference range, as disclosed in Patent Reference 1. In this case, since it is aimed at inspecting only the inner wall of the gaseous phase part of the tank, a lower pressure than that applied in the pressurizing method is applied.

In the micro-depressurizing method, the gaseous phase part of the tank is depressurized and it is determined whether the pressure rise value is kept at a reference value. Also in this case, since depressurization is carried out in the gaseous phase part, the inspection target is the inner wall of the gaseous phase part only.

Patent Reference 1: JP-A-10-19717
Patent Reference 2: U.S. Pat. No. 5,319,956

DISCLOSURE OF THE INVENTION

Problems that the Invention is to Solve

According to the conventional inspection methods, in the pressurizing method, since a medium such as gas or liquid is used to fill a tank for inspection, when inspecting a storage tank that has already been installed, the stored substance such as gasoline must be totally discharged once, and after the inspection is finished, the inside of the tank must be washed and then the stored substance must be put back therein. This is inefficient. Moreover, the inspection time is long and quick determination cannot be made.

Also, in the micro-pressurizing method and the micro-depressurizing method, since only the gaseous phase part is used as an inspection target, pressurization or depressurization is not carried out to such an extent that the pressure affects the liquid phase part, and the liquid phase part cannot be inspected in either method.

Thus, a method of depressurizing the inside of the tank to a pressure close to vacuum and detecting groundwater that enters the tank has been proposed, as disclosed in Patent Reference 2. This detection method is a combination of a method of measuring the water line of water in the bottom part of the tank due to the groundwater that has entered there because of the depressurization and thus detecting a leakage hole, and a method of detecting entry of air into the tank from the leakage hole on the basis of entry sound of bubbles. However, this detection method is for detecting leakage from the liquid phase part of the tank, and if no groundwater has accumulated below the liquid in the tank or if the groundwater is a little, the entry of water from the leakage hole cannot be detected or the detection accuracy is low. Moreover, the entry sound of bubbles is subtle and the entry of air from the very small leakage hole cannot be detected accurately.

This invention is made in view of the problems of the conventional techniques and it is an object of the invention to provide a leakage inspection apparatus for a liquid storage tank that enables easy and accurate leakage inspection for the tank even when a liquid is stored in the liquid storage tank.

Means for Solving the Problems

According to this invention, a leakage inspection apparatus for a liquid storage tank in which at least a part of a periphery of the liquid storage tank for gasoline, light oil or the like is submerged in water, includes a depressurizing device that depressurizes inside of this liquid storage tank, a rod part inserted in the liquid storage tank, a float that is fitted with the rod part and that is floated on the surface of the liquid in the liquid storage tank and moves along the rod part in accordance with displacement of the liquid surface, a moving magnet provided in the float, a reference magnet fixed on the rod part and situated in the liquid storage tank, a displacement sensor that detects the position of each of the moving magnet and the reference magnet, and a measuring device that finds out the position of the moving magnet relative to the reference magnet in accordance with a signal from the displacement sensor.

The displacement sensor is a magnetostrictive linear sensor that detects the position of the reference magnet and displacement of the moving magnet provided in the float. The reference magnet can be fixed to a lower part of the rod part and situated in the liquid of the liquid storage tank. Also, the measuring device has determining means such as a program to determine whether the displacement of the moving magnet relative to the reference magnet is equal to or more than a predetermined amount, or not. The liquid storage tank is submerged in water, and leakage from this tank part submerged in water is to be detected.

Moreover, according to this invention, the leakage inspection apparatus for the liquid storage tank has an acceleration sensor that is attached to a fixed object continuing to the liquid in the liquid storage tank and detects acceleration of vibration, and a determining device that determine whether a change of a signal from the acceleration sensor is equal to or more than a predetermined amount, or not. The acceleration to be detected is the acceleration of acoustic vibration that is generated as air enters the tank through the leakage hole of the tank, rises in the liquid in the tank as bubbles and bursts on the liquid surface. An attachment magnet part is integrally provided on the acceleration sensor, and the magnet part is attached to the fixed object as an attachment target by applying grease.

Advantage of the Invention

According to the leakage inspection apparatus of this invention, leakage inspection for the gaseous phase part and the liquid phase part of the tank part that is in contact with groundwater can be carried out efficiently, accurately and in a short time, regardless of the quantity of liquid in the liquid storage tank. Moreover, influence of changes in external temperature or the like can be eliminated and extremely accurate measurement is possible.

Also, as detection is done by using the acceleration sensor, leakage inspection for the liquid phase part in the part of the liquid storage tank that is not in contact with groundwater can be carried out accurately.

BRIEF DESCRIPTION OF THE DRAWINGS

FIG. 4 is a schematic longitudinal sectional view showing a state where an acceleration sensor of a leakage inspection apparatus of another embodiment of this invention is attached to a liquid storage tank.

Figure 1:
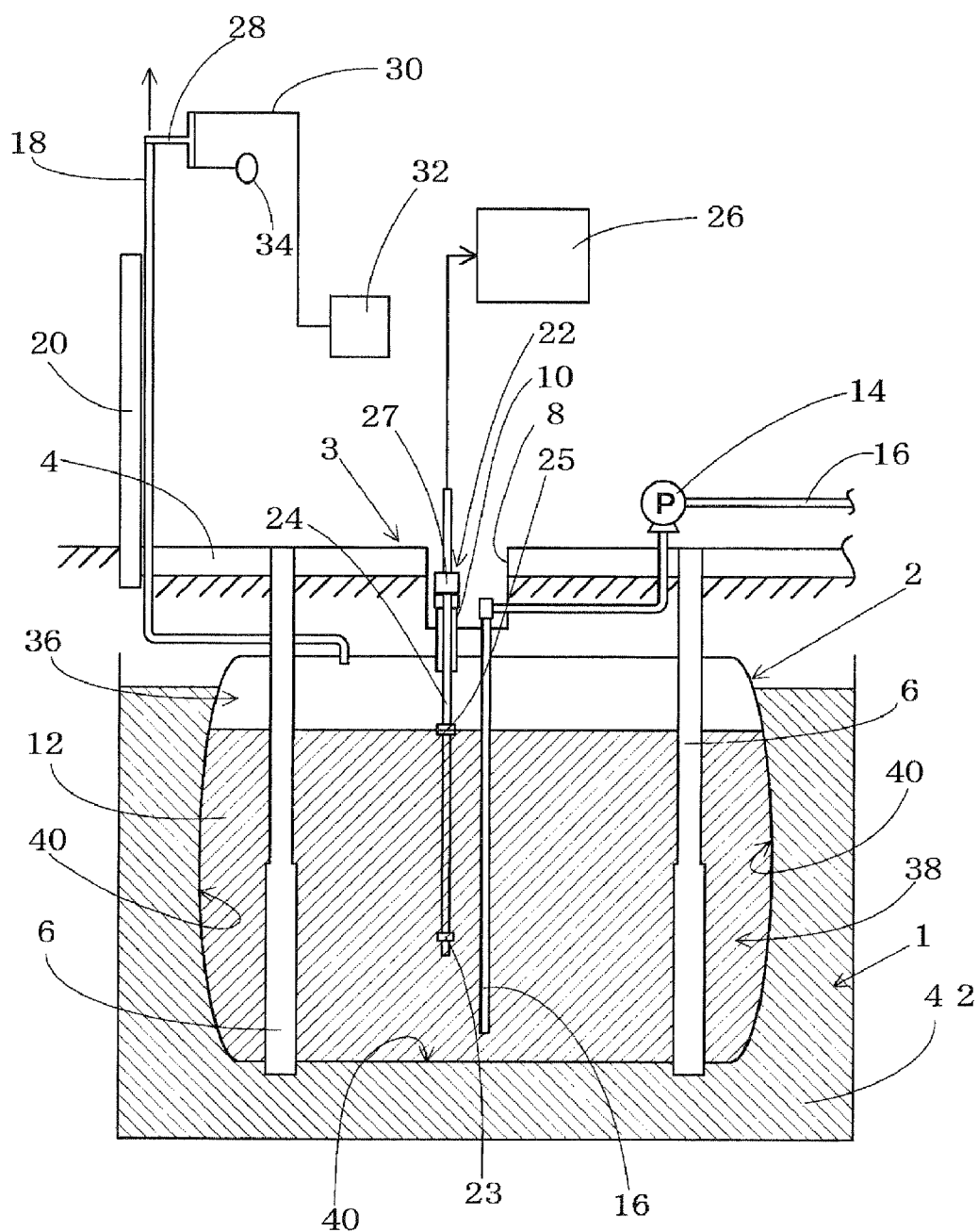
FIG. 1 is a schematic longitudinal sectional view showing a state where a leakage inspection apparatus of one embodiment of this invention is attached to a liquid storage tank.

DESCRIPTION OF REFERENCE NUMERALS AND SIGNS 2 tank
8 manhole part
10 measuring tube
12 stored object
14 suction pump
18 ventilation tube
21 moving magnet
22 magnetostrictive linear sensor
23 reference magnet
24 rod part
25 float
26 measuring device
27 body part
32 depressurizing device
34 pressure gauge
36 gaseous phase part
38 liquid phase part
44 acceleration sensor
46 determining device

BEST MODE FOR CARRYING OUT THE INVENTION

Figure 2:
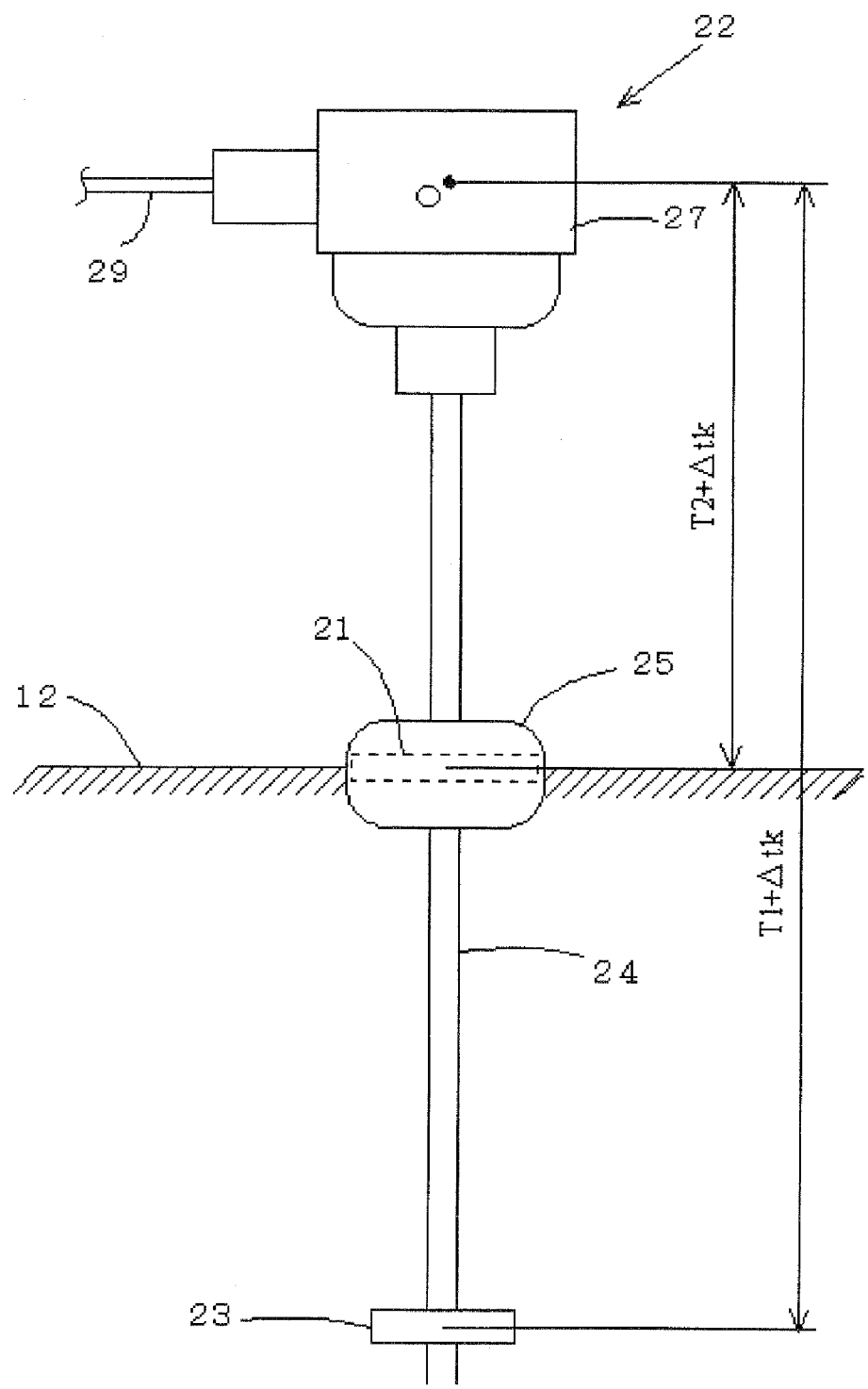
FIG. 2 is a front view showing a magnetostrictive linear sensor of the leakage inspection apparatus of the one embodiment of this invention.

Hereinafter, an embodiment of a leakage inspection apparatus for a liquid storage tank of this invention will be described with reference to FIG. 1 and FIG. 2. A liquid storage tank 2 in this embodiment is fixed in an installation space 1 formed underground, and is used for a gas station or the like. As shown in FIG. 1, an aboveground part 3 on the installation site of the tank 2 is paved with concrete 4 or the like, and the tank 2 is firmly fixed by a fixing unit 6 provided between the concrete 4 and the ground surface in the installation space 1. A manhole part 8 is provided in the aboveground part 3 situated above the tank 2, and in its inside, a measuring tube 10 for detecting the quantity of stored liquid in the tank 2 and a suction tube 16 to which a suction pump 14 to suck a stored object 12 such as gasoline is connected, are provided. The measuring tube 10 is inserted from above in the tank 2. The suction tube 16 inserted from the manhole part 8 is inserted with its distal end being close to the bottom in the tank 2. Moreover, a ventilation tube 18 connecting the gaseous phase space in the tank 2 to outside is provided, and the aboveground part of the ventilation tube 18 is situated along a fire wall 20.

The leakage inspection apparatus in this embodiment is for performing leakage inspection for the gaseous phase part and the liquid phase part of the tank 2 in the state where liquid is stored therein, and a magnetostrictive linear sensor 22, which is a displacement sensor for detecting displacement of the liquid surface, is used for detecting leakage. The magnetostrictive linear sensor 22 has a rod part 24 that is inserted in the measuring tube 10 and submerged in the liquid, and a float 25 that is fitted with this rod part 24 and that is floated on the surface of the liquid in the tank 2 and moves along the rod part 24 in accordance with displacement of the liquid surface. A moving magnet 21 is provided in the float 25, and a reference magnet 23 fixed to the rod part 24 is provided in the liquid of the stored object 12 in the tank 2 at the lower edge of the rod part 24.

A body part 27 is provided at the upper edge of the rod part 24, and a cable 29 for transmitting a detection signal and power extends from the body part 27. The cable 29 is connected to a measuring device 26 such as a computer having a program to calculate and measure the displacement of the liquid surface and to determine the presence or absence of leakage.

Also, a T-shaped connection tube 28 having a connection port for depressurization and a connection port for monitoring the pressure is connected at an edge part in the aboveground part of the ventilation tube 18, which serves as a passage for depressurization. A depressurizing device 32 such as a burst-proof depressurizing pump or ejector is connected to the connection port for depressurization of the T-shaped connection tube 28 via a connection passage 30 of the depressurizing device, and a pressure gauge 34 having, for example, a minimum scale of 1 kPa in the case of −50 kPa (Full Scale), is connected to the connection port for monitoring the pressure.

In the leakage inspection method of this embodiment, first, the gaseous phase part 36 of the tank 2 is depressurized by the depressurizing device 32 so that the pressure in the tank 2 becomes a lower pressure than the water head pressure equivalent to the difference between the remaining quantity of the stored object 12 and the liquid surface of the surrounding groundwater 42. A preset depressurization value acquired by subtracting the water head pressure at the water line of groundwater from the water head pressure on the liquid surface of the stored object 12, in consideration of the water line of the groundwater 42. Moreover, the difference in specific gravity between water and oil may be a problem, but oils have specific gravities of 1.0 or less and it is safe with respect to the preset depressurization value to consider oil approximately equal to water. Therefore, the water head pressure due to the difference in specific gravity will not be considered here.

The depressurization value is calculated, for example, by the following arithmetic formulas. For example, in the case of depressurization by 5 kPa, the depressurization value P is expressed as follows.

$$P(kPa)=(A\times 0.01)-(B\times 0.01)+5 \quad (1)$$

In the case of depressurization by 10 kPa, it is expressed as follows.

$$P(kPa)=(A\times 0.01)-(B\times 0.01)+10 \quad (2)$$

Here, P represents the depressurization set value (unit kPa), A represents the height of the liquid surface in the tank (unit mm), and B represents the water line of groundwater (unit mm). Also, the depressurization value in the tank 2 is prevented from becoming equal to or more than 20 kPa at the maximum in consideration of safety.

Next, the detection principle of the magnetostrictive linear sensor 22, which is a displacement sensor used in this embodiment, will be described. First, when a current pulse is applied to a magnetostriction line, which is the rod part 24, a magnetic field in a circumferential direction is generated in the entire area in the direction of the magnetostriction axis. As a magnet is brought close to the magnetostriction line, an axial magnetic field is provided only in this part. Then, a slant magnetic field is generated by the combination of the axial magnetic field and the circumferential magnetic field, and torsion occurs only in this part of the rod part 24. This torsion phenomenon is mechanical vibration. Its propagation time is measured and the absolute position of the float 25 with the moving magnet 21 is measured. Similarly, the position of the reference magnet 23 fixed to the rod part 24 is measured. As for the measurement resolution for these, the displacement of the liquid surface can be detected at a high resolution of 0.005% Full Scale or less (or 0.005 mm).

The leakage detection from the tank 2 in this embodiment is to detect rise of the liquid surface of the stored object 12 due to entry of the surrounding groundwater through a minute leakage hole caused by depressurization if the leakage hole exists in the tank 2. The quantity of the entering groundwater varies depending on the size of the leakage hole, the pressure in the leakage hole, and the area of the liquid surface in the tank 2. Particularly the area of the liquid surface in the tank 2 largely varies depending on the size of the tank and the water line. Therefore, to simplify determination, a minimum value in terms of safety is set as a threshold value to determine the presence or absence of leakage.

Since the magnetostrictive linear sensor 22 has a resolution of 0.005 mm, that is, a capability to detect slight displacement of the liquid surface, the influence of peripheral vibration on the displacement of the liquid surface, and expansion of the rod part 24 due to temperature pose problems. Particularly in measurement in an environment where the body part 27 will be exposed to direct sunlight during the measurement, thermal expansion of the rod part 24 with the lapse of the measuring time will be a problem. To cancel the influence of this thermal expansion, the reference magnet 23 is provided in this embodiment.

Here, the principle of canceling the influence of thermal expansion will be described below. The parts affected by thermal expansion are the body part 27 and the rod part 24 near this part. If displacement due to the heat is expressed by $\Delta tk$, the measured distance from the origin O of the body part 27 to the reference magnet 23 can be expressed by $T1+\Delta tk$, and the measured distance from the origin O of the body part 27 to the moving magnet 21 can be expressed by $T2+\Delta tk$, as shown in FIG. 2. The distance T1 is fixed. Also, the presence or absence of leakage can be determined in accordance with displacement of the moving magnet 21 relative to the fixed reference magnet 23, and therefore this displacement is expressed as follows.

$$(T1+\Delta tk)-(T2+\Delta tk)=T1T2 \qquad (3)$$

Thus, it can be understood that the influence $\Delta tk$ due to thermal expansion can be eliminated.

Figure 3:
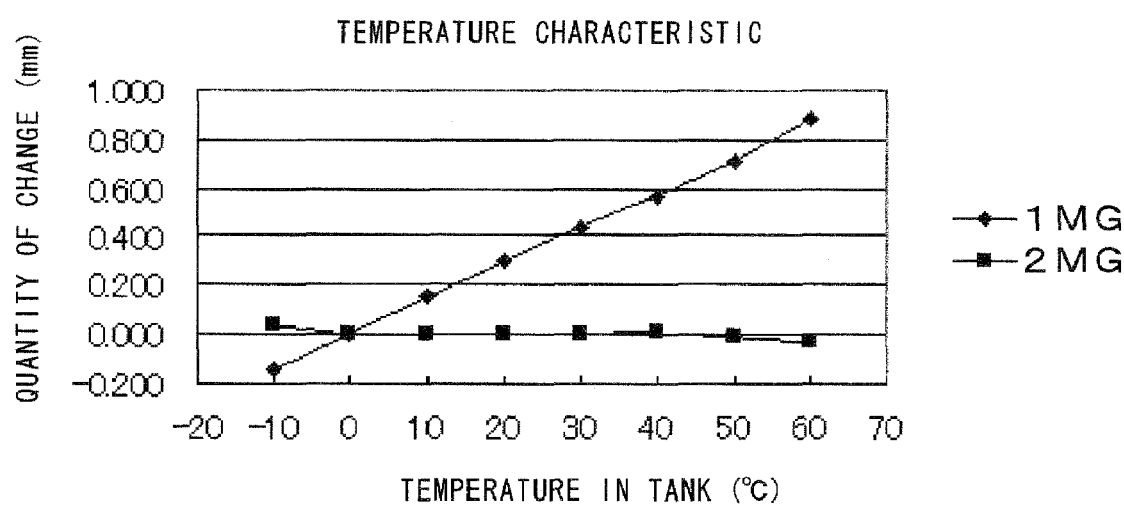
FIG. 3 is a graph comparing the influence of temperature rise in the leakage inspection apparatus of the one embodiment of this invention with a case where a reference magnet is not used.

FIG. 3 shows the influence of the external temperature on the output of the magnetostrictive linear sensor 22 according to this embodiment, and changes due to the external temperature of the output in the case where the reference magnet 23 is not provided. In this experiment, the body part 27 of the magnetostrictive linear sensor 22 was put in a thermostatic tank and the relation between the temperature in the tank and the output was plotted in a graph.

According to this, in the case where the reference magnet 23 was provided (line 2MG), the quantity of change was substantially constant regardless of the temperature in the tank, whereas in the case where the reference magnet was not provided (line 1MG), the quantity of change was proportional to the temperature in the tank. Therefore, it has been confirmed that the influence of the external temperature is eliminated almost totally by providing the reference magnet 23.

According to the leakage inspection apparatus of this embodiment, for example, even when expansion due to the external temperature occurs in the body part 27 in leakage inspection of the tank 2, it is possible to accurately detect a minute change in the liquid surface and detect leakage. Particularly, as the reference magnet 23 is provided near the lower end of the rod part 24 and situated in the liquid, it can be set as a reference position without being affected by the external temperature.

Next, another embodiment of a leakage inspection apparatus for a liquid storage tank of this invention will be described with reference to FIG. 4. Here, the constituent elements similar to those in the above embodiment are denoted by the same reference numerals and will not be described further in detail. Also the leakage inspection apparatus in this embodiment is to perform leakage inspection of the liquid phase part of the tank 2 in the state where liquid is stored therein, and it uses an acceleration sensor 44 for detecting leakage.

The acceleration sensor 44 has a magnet part on its lower side, and is fixed on as flat a surface as possible at the upper end of a curved part of the suction tube 16 situated in the manhole part 8. At the fixing position, grease is applied and the magnet part of the acceleration sensor 44 is attracted thereto. An output of the acceleration sensor 44 is outputted to a determining device 46 such as a computer via an amplifier 45. The acceleration sensor 44 is of detecting, for example, a distortion due to a piezoelectric device, or of detecting a change in electrostatic capacity. Preferably, it detects the acceleration of three-dimensional vibration, converts it to an electric signal, and outputs it.

In the leakage inspection method of this embodiment, first, the gaseous phase part 36 of the tank 2 is depressurized by the depressurizing device 32 in order to realize a lower pressure than the water head pressure due to the remaining quantity of the stored object 12 in the tank 2. Thus, in the case where a leakage hole exists in an inner wall 40 of the liquid phase part 38 of the tank 2, air enters the tank 2 through the leakage hole and rises as bubbles in the liquid of the stored object 12 in the tank 2. When these bubbles have reached the liquid surface of the stored object 12, they burst on the liquid surface, thus generating acoustic vibration. This vibration is propagated through the suction tube 16 inserted in the liquid phase part 38 of the tank 2, and the acceleration of the vibration is detected by the acceleration sensor 44. The signal from the acceleration sensor 44 is sent to the determining device 46 such as a computer via the amplifier 45, and the signal is identified. Then, the presence or absence of leakage is inspected in accordance with whether the output of the acceleration sensor 44 after the depressurization shows a high value of a predetermined level or more.

As for the determination level, if there is a sound of bubble bursting, leakage exists. Therefore, if a signal higher than the signal level before the depressurization, for example, 6 db or higher, it is determined that leakage is present, and if the signal level is lower than that, it is determined that leakage is absent.

Here, the significance of the detection of the acceleration will be described. The motion of this vibration is expressed by the trigonometric function cosine or sine, and it is a cyclic motion. Here, if cosine is used and the distance from a balance point is expressed by x, the motion of the vibration is expressed as follows.

$$x = a \cos \omega t \quad (4)$$

In the case of vibration, x represents the quantity of change. Here, $\omega$ is angular frequency, and when the frequency is f, $\omega = 2\pi f$ holds. a represents amplitude and t represents time. Therefore, the motion repeats the same cycle every $2\pi/\omega$.

Also, this motion has velocity and acceleration. As expressed by the following equations (5) and (6), the velocity is calculated by differentiating the equation (4) of the quantity of change x once, and the acceleration is calculated by differentiating the equation (4) twice.

$$\begin{aligned} \text{Velocity} &= d(a\cos\omega t)/dt \\ &= -a\omega\sin\omega t \\ &= a\omega\cos(\omega t + \pi/2) \end{aligned} \quad (5)$$

$$\begin{aligned} \text{Acceleration} &= d^2(a\cos\omega t)/dt^2 \\ &= a\omega^2\cos(\omega t + \pi) \end{aligned} \quad (6)$$

According to these equations, the vibration velocity increases in proportion to the frequency, but the vibration acceleration increases in proportion to the square of the frequency. From this, it can be said that in the case where the frequency is sufficiently high, detecting the vibration acceleration is better for detecting micro-vibrations generated by very small bubbles.

According to the leakage inspection apparatus of this embodiment, for example, in leakage inspection for the liquid phase part 36 of the tank 2, the detection is possible by using the acceleration sensor 44 even when a minute leakage hole with a diameter of 0.3 mm or less exists in the inner wall 40 of the liquid phase part 36. Moreover, high efficiency is realized because the inspection can be performed in the state where the stored object 12 is stored. Also, by using this acceleration sensor in addition to the foregoing embodiment that uses the linear sensor for detecting the liquid surface, leakage from the liquid phase part can be detected regardless of the presence or absence of groundwater around the liquid storage tank.

In this invention, the type of the liquid of the stored object in the liquid storage tank can be applied to a liquid with a kinematic viscosity of 150 mm$^2$/s or less such as gasoline, alcohols, solvents, kerosene, light oil and heavy oil. Also, the reference magnet may be situated at any position in the liquid storage tank that is not affected by the external temperature, and it may be at positions other than the lower end of the rod part. The leakage inspection apparatus using the acceleration sensor is applicable to leakage inspection for the tank inner wall between the liquid surface in the tank and the water surface of the groundwater in the case where the water line of the groundwater in the tank installation space is lower than the liquid surface in the liquid phase part of the underground tank, as well as in the case where there is no water around the outer wall of the tank. Moreover, it is also applicable to an aboveground liquid tank, and its application is not specified.

The invention claimed is:

1. A leakage inspection apparatus for a liquid storage tank, wherein at least a part of a periphery of the liquid storage tank is submerged in water, the apparatus comprising:
   a depressurizing device that depressurizes an inside of the liquid storage tank;
   a rod part adapted to be inserted in the liquid storage tank;
   a float that is fitted to the rod part to float on a surface of liquid in the liquid storage tank, the float being movable along the rod part in accordance with displacement of the liquid surface;
   a moving magnet provided in the float;
   a reference magnet fixed to a lower part of the rod part to be situated in the liquid in the liquid storage tank;
   a magnetostrictive linear sensor that detects a position of each of the moving magnet and the reference magnet;
   a measuring device which determines a position of the moving magnet relative to the reference magnet in accordance with a signal from the displacement sensor, and which determines whether or not displacement of the moving magnet relative to the reference magnet is equal to or more than a predetermined amount;
   an acceleration sensor which is attached to a fixed object continuing to the liquid in the liquid storage tank and which detects acceleration of a vibration; and
   a determining device that determine whether or not a change in a signal from the acceleration sensor is equal to or more than a predetermined amount.

2. The leakage inspection apparatus for the liquid storage tank according to claim 1, wherein an attachment magnet part is integrally provided on the acceleration sensor, and the magnet part is attached to the fixed object as an attachment target by applying grease.

* * * * *